Nov. 5, 1968  G. M. LA POINTE  3,409,058

SCREW HOLDER AND DRIVER

Filed Oct. 19, 1966

INVENTOR.
Gabriel M. Lapointe
BY
*Alson S. Blodgett*
ATTORNEY

United States Patent Office 3,409,058
Patented Nov. 5, 1968

3,409,058
SCREW HOLDER AND DRIVER
Gabriel M. La Pointe, Worcester, Mass., assignor to Parker Mfg. Company, Worcester, Mass., a corporation of Massachusetts
Filed Oct. 19, 1966, Ser. No. 590,166
5 Claims. (Cl. 145—50)

ABSTRACT OF THE DISCLOSURE

A screw driver having an elongated shank terminating in a screw holding and driving bit. The bit is of the "Phillips-head" type and is defined by a plurality of recesses arranged symmetrically about the axis thereof to provide a plurality of flutes. A slot extends into the bit and bisects two opposite recesses to form a bifurcate bit end, the furcations of which are bent in opposite directions so that they must be sprung inwardly toward one another upon introduction into the socket of a screw.

---

In the use of screws and, particularly, those of the so-called "Phillips-head" type, some difficulty is experienced in holding the screw while operating the screw driver. This is particularly true when the screw is to be used in an inaccessible corner of a piece of equipment. Various methods have been suggested to permit the screw driver to hold the screw; such methods have involved the use of metal clips which slide over the screw driver, of magnetizing the screw driver, or of providing a split expansible blade. Most of these methods have been inexpensive or easily rendered inoperative and have suffered from various other handicaps that have limited their extensive use. These and other difficulties experienced with the prior art devices have been obviated in a novel manner by the present invention.

It is, therefore, an outstanding object of the invention to provide a screw driver capable of grasping the screw during starting, which screw driver is simple in construction, inexpensive to manufacture, and capable of a long life of useful service.

Another object of this invention is the provision of a Phillips-head screw driver in which means is provided for grasping the screw, which means does not weaken the ability of the screw driver to transmit torque to the screw.

A further object of the present invention is the provision of a screw driver for use with Phillips-head or cross-slot screws in which means is provided for grasping the screw which is not rendered inoperative by dirt and the like.

With these and other objects in view, as will be apparent to those skilled in the art, the invention resides in the combination of parts set forth in the specification and covered by the claims appended hereto.

Figure 1:
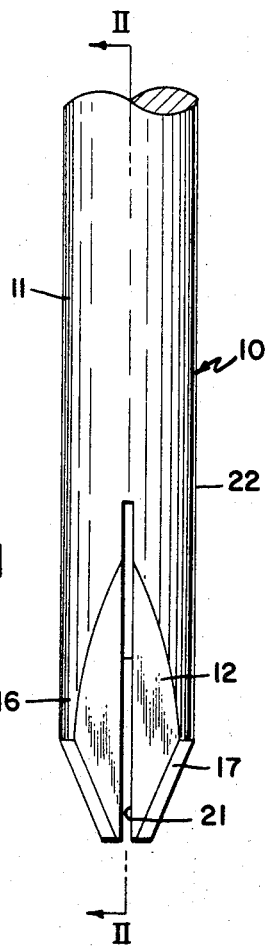
Figure 2:
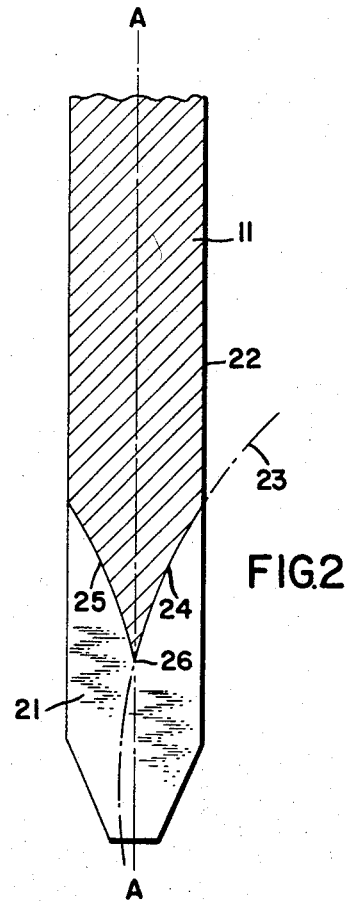
Figure 3:
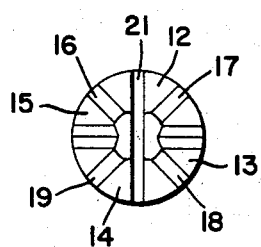
Figure 4:
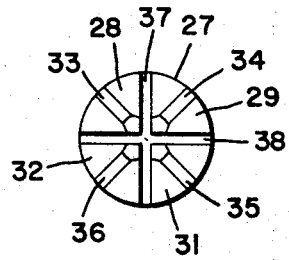

The character of the invention, however, may be best understood by reference to certain of its structural forms, as illustrated by the accompanying drawings in which:

FIG. 1 is an elevational view somewhat enlarged of a screw driver embodying the principles of the present invention, FIG. 2 is a sectional view of the screw driver taken on the line II—II of FIG. 1, FIG. 3 is an end view of the screw driver, and FIG. 4 is an end view of a modified form of the screw driver.

Referring first to FIG. 1, wherein are best shown the general features of the invention, the screw driver, indicated generally by the reference numeral 10, is shown as comprising a shank 11 of generally elongated cylindrical conformation. One end (not shown) is adapted to be attached in the usual way to a handle to complete the screw driver, while the end shown in the drawing is provided with four recesses, 12, 13, 14, and 15 defining between them four flutes 16, 17, 18, and 19. These four flutes are formed and arranged to fit into the so-called "Phillips-head" screw. This is a screw with a socket formed in the head which is cross-shaped and tapered downwardly so that, by use of a special Phillips screw driver, it is possible to apply considerable torque to the screw without danger of the screw driver slipping out. As is evident in FIG. 1, the ends of the flutes are pointed to exactly fit the Phillips-head screw. Extending through the center of the shank and passing through the axis of the cylindrical surface of the shank 11 is a slot 21. This slot is relatively narrow as compared to the thickness of the shank and extends rearwardly through the shank somewhat further than the furthermost extent of the recesses 12, 13, 14, and 15.

As is evident in FIG. 2, the shank 11 is provided with a cylindrical surface 22 which has an axis A—A. The slot 21 is formed by using a thin cutting wheel, such as a diamond cutting wheel, having a circular outer periphery 23 which, at the bottom of the slot 21 provides an arcuate surface 24. A similar arcuate surface 25 is formed at the other side by a similar cutting operation, so that the surfaces 24 and 25 might be defined as being the peripheries of two circles having their centers exterior of the shank 11 on opposite sides of the axis A—A, which circles intersect at a point 26 located on the axis A—A a substantial distance from the end of the screw driver.

The manufacturer of the screw driver is brought about by forming the regular Phillips-head screw driver in the usual way and then cutting the slot 21 by introducing a cutting wheel in the manner set forth above. After this has been done, the flutes 16, 17, 18, and 19 still fit snugly into the socket of a Phillips-head screw. Then, the screw driver is treated to deform the end of the shank 11 by bending the two halves of the end on either side of the slot 21 away from one another. A permanent deflection in these two directions takes place. Then, the screw driver is subjected to a heat treatment; more specifically, the shank 11 is formed from a suitable alloy steel, for example, AISI 6150 steel, and heat treated by immersion in a salt bath at around 1600° F. The shank is then quenched in a salt bath at around 500° F. This produces a hardening of the steel, particularly in the portions of the steel which are exposed. Now, it might be thought that the formation of the slot 21 would weaken the torque transmission capabilities of the screw driver. On the contrary, however, after the heat treatment described above, the end of the screw driver has almost the same torsional strength as it would have had with heat before the treatment of a similar screw driver without the slot. This is because, when heat treatment takes place with a normal screw driver that is not slotted, no access of the heat treatment takes places to the interior of the shank, so that the heat treatment occurs only on the outer exposed surfaces of the recesses and flutes. In the present case, however, the formation of the slot permits access of the heat treatment of the interior of the shank and, particularly, to the inner surfaces of the slot itself, so that added hardness of the steel surface and added torsional strength to the end of the shank is provided to replace the strength that was lost by the formation of the slot in the first place.

FIG. 4 shows a modified version of the present invention. In this case, a shank 27 of cylindrical form is provided at its outer end with recesses 28, 29, 31, and 32, defining between them flutes 33, 34, 35, and 36 forming the usual Phillips-head screw driver. Bisecting the opposed recesses 28 and 31 is a slot 37, while a similar slot 38 bisects the opposed recesses 29 and 32. The slots 37 and 38 form a cross at right angles to each other, as is evident in the drawing. The shank is then subjected to deformation pressing the two halves of the end on opposite sides of the slot 37 away from one another and similarly performing another deformation operation to push the two halves of the end of the shank on opposite sides of the slot 38 away from one another for permanent springing in this manner. The shank 27 is subjected then to the same heat treatment as has been described in connection with the version of the invention shown in FIGS. 1, 2, and 3.

In operation, the screw driver is inserted into the socket of a Phillips-head screw or the like but, because of the spring deformation existing on opposite sides of the slot 21 in the case of the screw driver shown in FIG. 1 and on opposite sides of the slots 37 and 38 in case of the screw driver shown in FIG. 4, it is necessary to force the screw driver slightly into the socket. This spring action on opposite sides of the slots causes the flutes to press tightly into the corresponding recesses formed in the screw head and to grasp the screw head tightly. It is, therefore, not necessary to hold the screw with the hand; the screw driver takes care of this adequately and it is possible to concentrate on the placement of the screw and its rotation by means of the screw driver. The present invention makes it possible, of course, to use the screws in areas where there is room for the screw driver to advance close to the place where the screw is to be driven, but not to place a hand in that area to hold the screw. The fact that the slots provide access to the interior of the end of the shank of the screw driver means that it is possible with heat treatment to bring the torsional strength of the screw driver at the end up to substantially what it was before the slots were formed, so that it is possible to obtain the benefits of the present invention in its ability to hold the screw without loss of strength or possibility of the screw driver breaking.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A screw driver for use with a socket-head screw, comprising
   (a) an elongated shank of generally cylindrical form having a pointed end,
   (b) a series of recesses at the said end arranged symmetrically about the axis of the shank to provide a plurality of flutes adapted to fit the socket-head screw, the flutes being cross-shaped in transverse cross-section, and
   (c) a slot extending in such a way as to bisect two opposite recesses and extending entirely through the said end of the shank through the axis and extending lengthwise of the shank approximately as far as the said recesses, the shank having been hardened by heat-treatment in such a way that the heat-treatment has access to all of the surfaces of the slot.

2. A screw driver as recited in claim 1, wherein the recesses and flutes are initially formed to fit exactly into the socket in a said screw but, after the slot has been formed, it is deformed to bend the portions of the end of the shank on either side of the slot in opposite directions, so that the said portions must be sprung inwardly toward one another upon introduction into the socket in a screw.

3. A screw driver as recited in claim 1, wherein the heat-treatment is sufficient to restore the torsional strength of the end of the shank to substantially that which existed before the slot was formed.

4. A screw driver as recited in claim 1, wherein the shank is made of AISI 6150 steel and the heat-treatment consists of heat the shank to 1600° F. in a salt bath and quenching it in a salt bath at 500° F.

5. A screw driver as recited in claim 1, wherein the bottom of the slot is formed as two circles whose centers are external of the shank and which intersect on the axis of the shank.

References Cited

UNITED STATES PATENTS

| | | | |
|---|---|---|---|
| 1,385,915 | 7/1921 | Hardey | 145—50.4 |
| 2,015,878 | 10/1935 | Trotter | 145—50.3 |
| 2,646,829 | 7/1953 | Phipard | 85—45 X |
| 2,729,998 | 1/1956 | Deliso | 145—50.4 X |
| 3,208,489 | 9/1965 | Walker et al. | 145—50.4 |

ROBERT C. RIORDON, *Primary Examiner.*

R. V. PARKER, JR., *Assistant Examiner.*